United States Patent
Maurer et al.

(10) Patent No.: US 6,418,170 B1
(45) Date of Patent: Jul. 9, 2002

(54) METHOD AND APPARATUS FOR ACHIEVING 180° PHASE INVARIANT TRANSMISSION IN A PCM MODEM SYSTEM

(75) Inventors: Patrick Maurer, Reading; Dae-Young Kim, Lexington; Sepehr Mehrabanzad, Southborough, all of MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,173

(22) Filed: Feb. 7, 2000

(51) Int. Cl.$^7$ ............................................. H04B 14/06
(52) U.S. Cl. ..................... 375/244; 375/222; 375/286
(58) Field of Search ......................... 375/242, 247, 375/244, 245, 254, 222, 286, 243

(56) References Cited

U.S. PATENT DOCUMENTS

| | | | | |
|---|---|---|---|---|
| 4,713,817 A | * | 12/1987 | Wei | 714/758 |
| 5,040,191 A | * | 8/1991 | Forney, Jr. et al. | 375/263 |
| 5,387,885 A | * | 2/1995 | Chi | 333/100 |
| 5,818,879 A | * | 10/1998 | Eyuboglu et al. | 375/286 |
| 6,173,015 B1 | * | 1/2001 | Eyuboglu et al. | 375/286 |
| 6,181,752 B1 | * | 1/2001 | Kim | 375/346 |
| 6,198,776 B1 | * | 3/2001 | Eyuboglu et al. | 375/286 |
| 6,201,836 B1 | * | 3/2001 | Kim | 375/265 |
| 6,201,842 B1 | * | 3/2001 | Kim | 375/346 |

\* cited by examiner

*Primary Examiner*—Stephen Chin
*Assistant Examiner*—Lenny Jiang

(57) ABSTRACT

In a PCM modem system in which equivalence classes are used to communicate information from a transmitter to a receiver, a method is provided to solve the problem of 180° phase reversals in the communications channel which result in a garbled transmission. This is accomplished by remapping the equivalence classes into a form that can be differentially encoded and decoded such that equivalence class identity is not lost during a phase reversal of the channel.

14 Claims, 1 Drawing Sheet

METHOD AND APPARATUS FOR ACHIEVING 180° PHASE INVARIANT TRANSMISSION IN A PCM MODEM SYSTEM

FIELD OF THE INVENTION

This invention relates to a telecommunications system and more particularly to a method and apparatus for eliminating problems of 180-degree phase reversal in the communications channel when transmitting data utilizing a PCM modulation system.

BACKGROUND OF THE INVENTION

PCM modulation systems are those in which data is transmitted from an analog modem, to an analog loop and a central office to a digital modem. The modulation scheme utilized in such systems includes mapping the incoming data to so-called equivalence classes. These equivalence classes are utilized to allow a larger minimum distance between constellation points utilized in encoding the incoming data stream. Equivalence classes are often used with pre-coding as described in U.S. patent application Ser. No. 08/999,249 entitled Device and Method for Pre-Coding Data Signals for PCM Transmission, assigned to the assignee hereof and incorporated herein by reference. "Constellation points" refers to numbers that ultimately translate to the voltage levels with which the particular incoming symbols are represented in the analog loop of the PCM channel in the data transmission scheme. By enabling larger distances between the constellation levels, one is allowed to communicate with a minimum of error, or stated differently, in a more robust manner. It will be noted that if the levels associated with the constellation are close together, the levels are more difficult to distinguish from one another, resulting in detection errors.

While the use of the equivalence classes is known, when transmitting information utilizing such equivalence classes if there is 180-degree phase reversal in the channel (i.e., the channel is "flipped" or negated), the transmitted data are corrupted and no useful information is obtained.

Phase reversals, while rare in the United States, are intentionally inserted into the communications channel for billing purposes in Europe and other locations. What in effect is done is that the channel is phase reversed by switching the transmission line pairs periodically, e.g., once a second. Each of the phase reversals is then counted at a central office or end user location. The counted phase reversals are then used as a "meter" for billing purposes.

It will be appreciated that in a PCM modulation system if the channel is phase reversed once every second, the loss of data is catastrophic. This is because information relating to the identity of an equivalence class is lost. One approach to solving the problem of the 180-degree phase reversal in the channel is to utilize overly large equivalence classes such that if the phase reversal occurs during the transmission of the equivalence class, the data maps back into the same class such as that there is no ambiguity.

The problem with such an approach is that such a scheme uses twice as many points to protect against channel reversal. This type of solution also decreases the transmit rate significantly. In one embodiment such an approach would decrease the transmit rate by 1 bit per symbol, or 8000 bits/sec. for a 56 kbit/sec modem.

SUMMARY OF THE INVENTION

In order to immunize the PCM modulation system from phase reversals, in the subject system an encoding scheme is provided for the equivalence classes in which equivalence class pairs are provided with "sign bits" which are opposite in value. Thus for each equivalence class there is a sign bit and there is a magnitude bit or set of bits.

It is a finding of this invention that the corruption of the data due to phase reversals of the communication channel is due to misidentification of equivalence classes at the receiver because the equivalence class label is corrupted. By relabelling the equivalence classes in the manner specified herein, and by using a differential encoder at the transmitter and a differential decoder at the receiver, any errors in the equivalence class label due to the channel inversion nonetheless result in a correct identification of the equivalence class at the receiver.

As to the equivalence class pairs, making the sign bit of one of the pair 0 and the other of the pair 1, and by utilization of differential encoding and decoding, if there is a phase reversal in the channel, then after differential decoding, the sign bit of the decoded equivalence class matches the sign bit of the originally intended and encoded equivalence class. Further, the magnitude bits are unaffected by the phase reversal, because a phase reversal does not alter magnitude. Thus the identity of the equivalence class is not lost.

More specifically, in a PCM modem system in which equivalence classes are used to communicate information from a transmitter to a receiver, a method is provided to solve the problem of garbled data transmission due to 180° phase reversals in the communications channel. This is accomplished by remapping the equivalence classes into a form that can be differentially encoded and decoded such that the identity of equivalence classes is unaffected by a phase reversal in the channel. It is the loss of identity of an equivalence class which results in a corrupted transmission. In one embodiment, a differential encoder/decoder pair is utilized with the relabeled equivalence classes to permit identification of the equivalence classes unaffected by the phase reversal of the channel. This is because the sign bits assigned to the equivalence classes which may be affected by the phase reversal in the channel, when received, match the original sign bits upon differential decoding. Thus the information transmitted is received correctly whether the phase reversal is absent or present.

Note that equivalence classes are paired in terms of two sets of points where by negating the members of one set one obtains the members of the other set. Because of the subject equivalence class labeling system and because of the existence of the pairs, if the channel does reverse phase, there is no effect upon the classes. If there is a phase reversal, a class is mapped to its pair-mate. This does no harm because with the differential mapping the constellation points represent the same data.

In the illustrated embodiment, the mapping format used provides equivalence class labels in a binary-coded form involving a sign bit and magnitude bits. The pairs of original transmitted equivalence classes are equal in every bit position except one, the sign bit, where they are opposite.

Otherwise stated, the original equivalence classes are mapped to a number expressed in binary notation having a sign bit and magnitude bits. After mapping, by differentially encoding the sign bit of each equivalence class, the received equivalence classes can be decoded correctly regardless of a positive or negative phase of the channel. The success of the subject method is because if the signs of the differentially constructed equivalence classes are all "flipped" or sign-inverted, the received equivalence classes will nonetheless match the originally transmitted equivalence classes in identity which avoids corrupted or unintelligible data.

It will be appreciated that the magnitude bits are not affected by phase reversal of the channel. Magnitude bits are in reality voltage amplitudes whose magnitude is independent of the sign. Thus at the receive side, detecting amplitude, e.g., absolute value, yields the same value whether inverted or not. For example, the magnitude +10 and the magnitude of −10 are the same.

On the other hand, if the value of +10 is in equivalence class A, and the value −10 is in equivalence class B, then a phase reversal, while not changing the amplitude, puts a member of one equivalence class into another, its "phase-pair mate". In this case the equivalence classes are confused as to their identity. As a result, received data is detected as a different, unintended pattern of data.

BRIEF DESCRIPTION OF THE DRAWINGS

This and other features of the subject invention will be better understood in connection with the Detailed Description taken in conjunction with the Drawings of which.

DETAILED DESCRIPTON

To design a 180°-invariant constellation for V.92, it is necessary to map equivalence class labels in such a way that if the polarity of the channel is reversed, the sequence of information bits is not changed.

Figure 1:
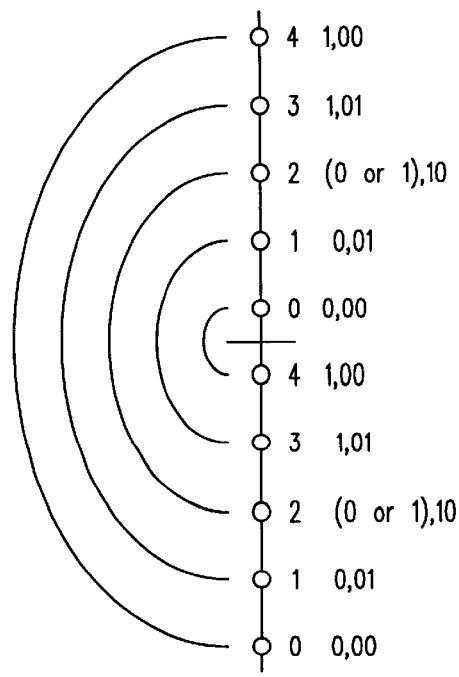
FIG. 1 is a diagrammatic representation of an example constellation with equivalence class labeling for M=5, showing the equivalence class pairs and the sign bit and magnitude bits for each equivalence class.

As illustrated in FIG. 1, suppose one has M equivalence classes to be assigned to the points in a constellation. One method of assigning equivalence class labels is defined by assigning the label "0" to the smallest positive point, "1" to the next larger point, and so on, until either the largest positive point is reached, or the largest equivalence class label, "M−1" is assigned. If the largest equivalence class label is reached before the largest point, the next larger point is assigned to class "0" and the process continues. Negative numbers are assigned equivalence class labels in a similar manner, but the negative point closest to 0 is assigned the class label "M−1", and the next more negative point is labeled "M−2", and so forth. This labeling is used to ensure a large distance between members of an equivalence class.

The difficulty with achieving 180° invariance using this scheme is that a polarity change in the channel causes, for example, the points just above and below 0 (the origin), which are equal in magnitude but opposite in sign, to be swapped. This causes equivalence classes "0" and "M−1" to be swapped, and these two classes can be referred to collectively as a "phase pair". The next outer points, those mapped to "1" and "M−2" (assuming for this example that M≧2), are also a phase pair. So each equivalence class "m" is swapped with class "M−1−m". In the case where M is odd, the class (M−1)/2 maps to itself. Suppose for discussion that this class by itself is a phase pair called a "phase self-pair". Note in FIG. 1 the following phase pairs: (0, 4), (1, 3), and 2 (self-pair).

To mitigate this problem, a method by which the equivalence classes can be differentially encoded is required. One example embodiment follows. Assign to each phase pair a distinct bit pattern. These patterns are shown for each point in FIG. 1, as the patterns after the commas. Each equivalence class then has a bit pattern associated with it, inherited from its phase pair and different from that of any other phase pair. To one equivalence class within each phase pair, append a 0 to its pattern. Append a 1 to the pattern of the other member of the pair. In the case of a self-pair, append either a 0 or 1 to the class. This appended bit can be called a "class bit". The class bits are shown as the bits before the commas in FIG. 1.

Figure 2:
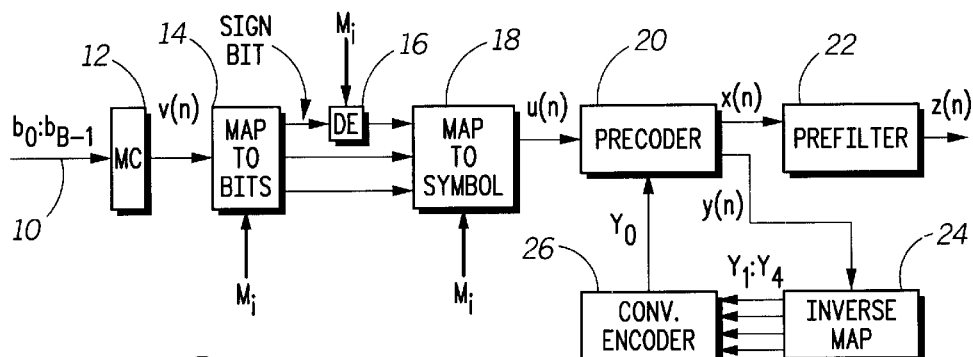
FIG. 2 is a block diagram showing the transmitter structure to permit protection against a 180° phase inversion of the communication channel, showing utilization of an equivalence class differential mapper; and, FIG. 3 is a block diagram of a receiver structure utilizing an equivalence class differential demapper.

Having assigned these bits as described, each phase pair consists of two equivalence classes with bit patterns that differ in only one position, and this position is the same (or known) for each pattern among all classes (e.g., the leftmost bit). The above mapping defines the operation of the map-to-bits block 14 in FIG. 2, taking the modulus converter output equivalence classes as input, and converting these equivalence classes into the Class (or sign) Bit, Phase-Pair (or magnitude) Bits format. As a sequence of equivalence classes emerges from the modulus converter, these classes are converted to the above described form, and the class bit stream is differentially encoded as represented by DE block 16 in FIG. 2. Differential encoding and decoding of a binary data stream is well known in the art. The differentially encoded class bits are combined with the defined phase-pair bits and inverse-mapped back into equivalence class labels as shown in map to symbol block 18 of FIG. 2. This also allows the exemplified embodiment to be implemented without further change to the transmitter.

Figure 3:
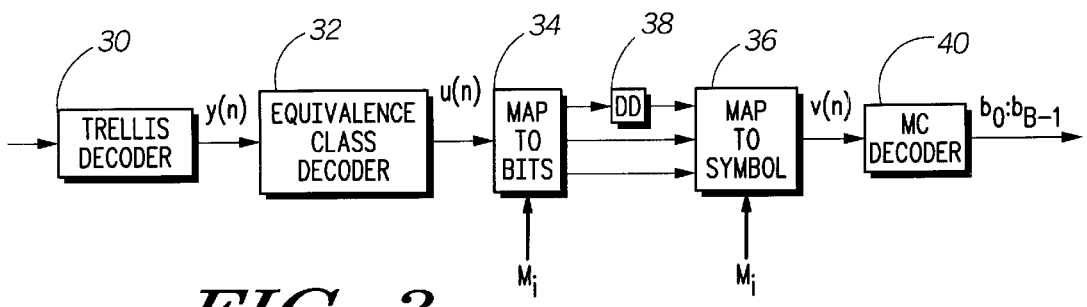

At the receiver, equivalence class decoder 32 outputs equivalence classes as shown in FIG. 3. These equivalence classes might or might not have been affected by phase reversal. These equivalence classes are mapped to the same (or equivalent) form as described by the transmitter, i.e., map to bits block 34 in FIG. 3 is the same as or equivalent to that of FIG. 2. The class-bit stream output from map-to-bits block 34 is differentially decoded, resulting in the intended class bit stream. In the case of a phase self-pair, the class bit is ignored because this particular equivalence class is already phase-invariant. These recovered class-bits are recombined into equivalence classes recognizable to the rest of the receiver, just as in the transmitter. Thus, map to symbol block 36 in FIG. 3 is the same as or equivalent to block 18 of FIG. 2.

It should be noted that the above is only one implementation of the rule to be used. In general, it is only necessary to define a "0-set" and a "1-set" such that if an equivalence class is in one set, its phase-pair mate is in the other. A phase-self-pair could be in either (or both), but a rule must be established for determining the value assigned to it for each occurrence. One such rule is to designate a value (0 or 1) for each occurrence of a symbol from a phase-self-pair such that the differential encoder output is a zero. This requires a decision at the encoder, but allows the receiver to simply assign the label "0" to a phase-self-pair as input to the differential decoder.

A method is therefore described for combining generalized Tomlinson-Harashima (TH) precoding with 4D trellis codes which provides 180 degree phase invariance for the PCM upstream (analog modem to digital modem direction) channel.

Referring again to FIG. 2, in greater detail on the transmit side, an incoming bit stream 10 is applied to a modulus converter 12 which is in turn coupled to a mapping block 14 which maps the output of the modulus converter to the type of structure shown in FIG. 1 in which each equivalence class is provided with a label that includes a sign bit and magnitude bits. It will be appreciated that the output of block 14 includes a sign bit which is coupled to a differential encoder 16 such that it is only the sign bit which is differentially encoded. Thereafter the output of the differential encoder as well as the output of unit 14 is coupled to inverse mapping unit 18, which takes the structure shown in FIG. 1 and turns it back into the original equivalence labels which are then coupled to a precoder 20 and thence to a prefilter 22. Note that the output of prefilter 22 is that which is transmitted to the receiver.

It will be noted that as an input to units 14, 16 and 18 there is a parameter Mi which refers to the number of equivalence classes at time index i. Output redundancy coding is provided after an inverse map 24 coupled to a convolutional encoder 26, the purpose of which when coupled back to a precoder 20 provides error protection and other transmitter requirements.

The differential encoder is conventional with one exception, how it handles the class bit for a phase-self-pair. A phase self pair is an equivalence class that maps to itself upon phase reversal rather than to another equivalence class. It occurs only when the number of equivalence classes, M, is odd. A differential encoder takes an input bit stream x(i), where i is the time index, and converts it to differential form d(i) according to the equation $d(i)=d(i-1)\oplus x(i)$, where the initial state d(0) is assumed known (say, 0), and "$\oplus$" denotes addition modulo 2. If x(i) is the class bit stream out of map to bits block 14, it is this sequence d(i) which is recombined with the phase-pair bits to form 180° phase invariant equivalence classes.

The exception of a phase self pair is handled as follows. A phase self pair is identified as described earlier, using the value $M_i$. If the class bit comes from a phase self pair, one embodiment simply forces the differential bit value d(i) to 0, regardless of x(i). This allows the differential decoder at the receiver to automatically assume a known value for the class bit when it encounters a phase self pair.

Turning now to FIG. 3, the received signal is decoded at a trellis decoder 30 coupled to an equivalence class decoder 32 which is turn coupled to a same type mapping block 34 as block 14 in the transmitter. The output of block 34, in addition to being coupled to inverse map 36 is also coupled to a differential decoder 38 which differentially decodes the sign bit for the equivalence classes. Thereafter the output of block 36 is coupled to a modulus conversion decoder 40 to recover the original data.

The differential decoder is conventional with one exception, how it handles the class bit for a phase-self-pair. A differential decoder takes an input differential bit stream d'(i), where i is the time index, and converts it to non-differential form x(i) (equal to x(i) in the transmitter) according to the equation $x(i)=d'(i-1)\oplus d'(i)$. If d'(i) is the differential class bit stream out of the map to bits block 34 in FIG. 3, it is this sequence x(i) which is recovered irrespective of phase reversal and recombined with the phase-pair bits to recover the original equivalence classes.

The exception of a phase self pair is handled as follows. A phase self pair is identified as described earlier, using the value $M_i$. If the differential class bit comes from a phase self pair, one embodiment simply assumes the differential bit value d(i) to be known (say, 0), regardless of any phase reversal. This assumption is possible because in the transmitter the differential class bit was in fact forced to this known value.

It will be appreciated that by remapping the original equivalence classes into a binary coded representation or label and by dealing with only the sign bit in terms of differentially encoding and decoding, as can be seen from the explanation of FIG. 1, any phase reversals encountered in the communications passed between a transmitter and a receiver will be ignoreable. As mentioned hereinbefore, the reason that one can ignore the phase reversal, at least as to the sign bit is because it maps back to itself even if there is a phase reversal in the communication channel.

What has therefore been accomplished is the elimination of the problem of 180-degree phase reversals in the communications channel, however engendered. Whether the 180-dgreee phase reversal is engendered purposely for billing purposes or inadvertently, the subject system compensates for the phase reversal by permitting the ignoring of the effects of the phase reversal.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a PCM modem system in which information is transmitted from a transmitter to a receiver utilizing equivalence classes in which data points reside in terms of constellation levels, a method for protecting against the effect of phase reversal in the communications channel between the transmitter and the receiver comprising the steps of:

labeling pairs of equivalence classes with sign bits one having a positive value and one having a negative value, wherein the labels for the equivalence classes are in a binary notation;

differentially encoding the sign bits at the transmitter; and differentially decoding the sign bits at the receiver.

2. The method of claim 1, wherein the labeling and the use of a differential encoder and decoder results in unambiguous identification of the equivalence class regardless of channel phase reversal, thus to avoid data corruption.

3. The method of claim 2, wherein the equivalence class identity and its value are respectively encoded with a sign bit and at least one magnitude bit.

4. The method of claim 3, wherein the values of the sign bits for a pair of equivalence classes are opposite.

5. The method of claim 3, wherein the differential encoding step includes the steps of subtracting a present sign bit from a previous sign bit, with the difference being that which is transmitted from the transmitter to the receiver.

6. In a PCM modem system in which equivalence classes are used to communicate information from a transmitter to a receiver, a method for overcoming the effect of phase reversals of the communications channel which result in a garbled transmission, comprising:

remapping the equivalence classes into a form that can be differentially encoded and decoded such that the equivalence class identity is not lost during a phase reversal of the channel and such that transmitted labels for the equivalence classes are in a binary notation.

7. The method of claim 6, wherein the remapping includes assigning a sign bit to each equivalence class.

8. The method of claim 7, and further including the steps of differentially encoding the sign bit at the transmitter and differentially decoding the sign bit at the receiver.

9. In a PCM modem system having a transmitter and a receiver a method for immunizing the system from phase reversals of a communications channel, comprising providing a plurality of transmittable label bits in a binary format for equivalence classes and assigning at least one magnitude bit to an equivalence class, the magnitude bit being unaffected by phase reversals.

10. The method of claim 9, wherein the step of providing a plurality of transmittable label bits further comprises providing sign bits.

11. The method of claim 10, and further including the steps of differentially encoding the sign bits at the transmitter and differentially decoding the sign bits at the receiver.

12. The method of claim 9, wherein one of the plurality of transmittable label bits is a sign bit.

13. The method of claim 12, wherein equivalence class pairs are provided with sign bits which are opposite.

14. A method for improving performance of a PCM modem system, comprising:

providing, in binary format, a plurality of transmittable label bits for equivalence classes; and utilizing at least one of the plurality of transmittable label bits to immunize the PCM modem system from phase reversals of a communications channel.

\* \* \* \* \*